Figure 1:
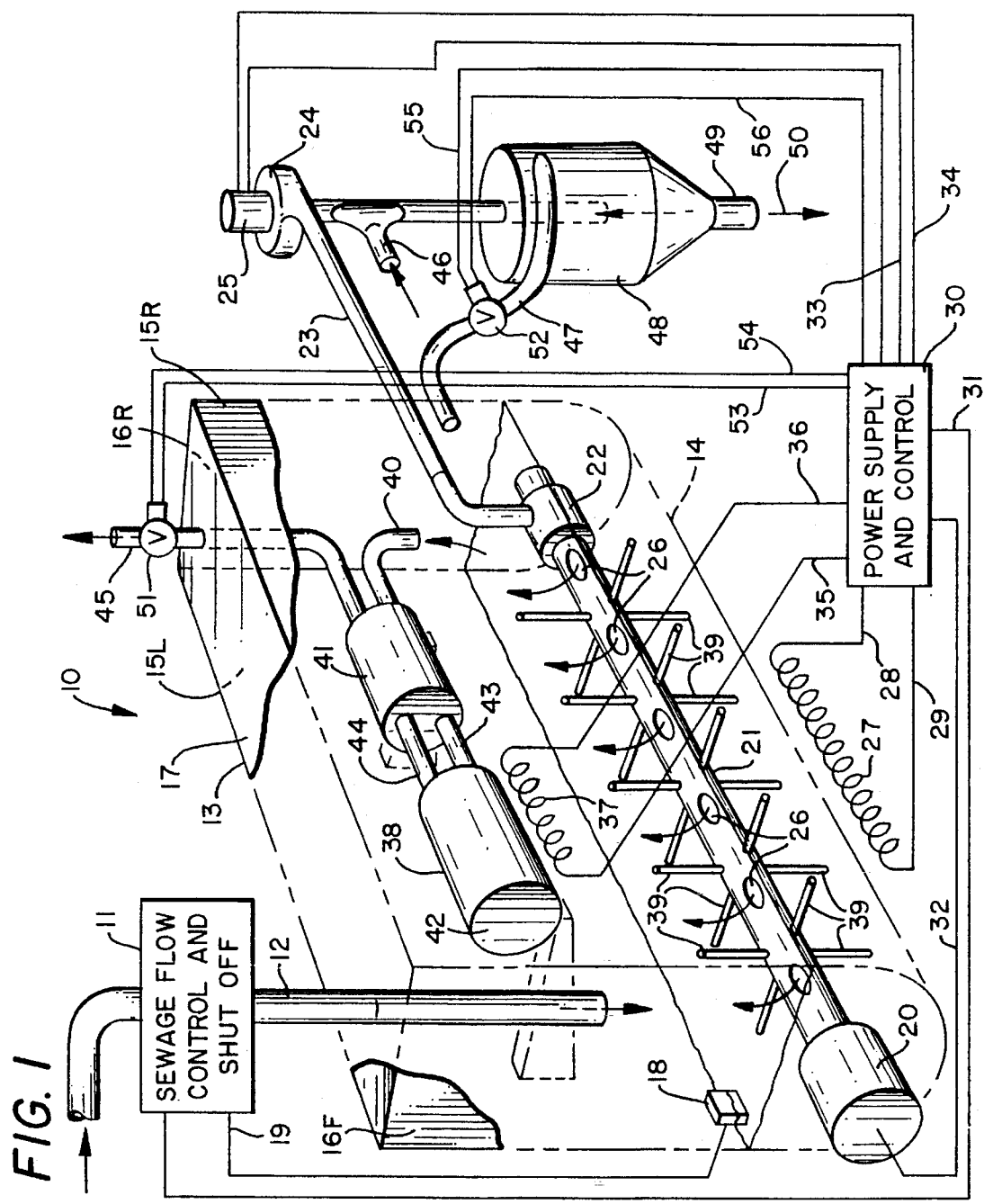

United States Patent [19]
Curtis

[11] Patent Number: 5,492,621
[45] Date of Patent: Feb. 20, 1996

[54] SEWAGE WATER AND SOLIDS TREATMENT AND DISPOSAL SYSTEM

[76] Inventor: Robert L. Curtis, 5007 Live Oak Dr., Dickenson, Tex. 77539

[21] Appl. No.: 216,145

[22] Filed: Mar. 23, 1994

[51] Int. Cl.$^6$ ................................................. B01D 1/14
[52] U.S. Cl. ........................... 210/98; 110/216; 210/149; 210/179; 210/180; 366/102; 422/225
[58] Field of Search ............................. 210/86, 98, 109, 210/134, 142, 178, 179, 180, 218, 219, 220, 149, 258, 259, 512.1, 758, 763, 774, 806; 422/184, 225; 110/190, 216, 244, 250, 254; 366/102, 107; 4/111.1, 111.2, 111.4, 111.5; 261/8, 85, 87; 55/459.1

[56] References Cited

U.S. PATENT DOCUMENTS

| | | | |
|---|---|---|---|
| 4,499,614 | 2/1985 | Yeagley | 422/225 |
| 5,230,164 | 7/1993 | Kishi | 4/111.1 |
| 5,256,378 | 10/1993 | Elston | 422/225 |
| 5,257,466 | 11/1993 | Kishi | 4/111.1 |
| 5,261,126 | 11/1993 | Kishi | 110/216 |
| 5,357,880 | 10/1994 | Kishi | 4/111.1 |

Primary Examiner—Joseph W. Drodge
Attorney, Agent, or Firm—Warren H. Kintzinger

[57] ABSTRACT

Sewage water with entrained solids as an effluent is fed into the trough bottom shaped process tank that is a totally enclosed tank other than for inlets and outlets therefore. The system disposes of water from sewage effluents and also residual solids thereof and is fed sewage to a controlled depth in a tank trough with high temperatures used to sterilize the effluent. A two-speed motor driven mixer driven at low speed continually mixes and blend the sewage effluent at the same time air from a blower is bubbled through the mixture. Heat is added to increase water vapor saturation capability of the air flow through the system. The air/vapor mixture flows through a recuperative heat exchanger supported within the tank above the surface of sewage effluent contained therein, absorbing heat with flow, through a catalyst bed in a chamber with circulation through the heat exchanger and on out an exhaust vent with impurities oxidized and vented with air flow. Heating elements subject to power control heat the tank and the heat exchanger.

17 Claims, 1 Drawing Sheet

SEWAGE WATER AND SOLIDS TREATMENT AND DISPOSAL SYSTEM

This invention relates in general to sewage treatment systems, and more particularly, to a sewage fluid and solids treatment and disposal system.

Disposal of domestic waste in progressively becoming an ever increasing problem with waste accumulating at an ever increasing rate particularly since they can no longer be dumped into lakes, streams, rivers or the oceans or dumped on (or in) the ground. A number of different systems have been suggested and/or tried but most of these prior-art systems have been bulky, complex and sometimes dangerous because of extremely high temperatures and processes used with some systems. There also is a need for a small efficient sewage water and solids treatment and disposal system capable of process handling, for example, the output of four adults on a daily basis. Homes in remote out in the country locations have a need for improved sewage treatment and disposal systems.

It is, therefore, a principal object of this invention to provide a new sewage treatment and disposal system for individual houses.

Another object is to provide a safe sewage fluid and solid treatment and disposal system.

Still another object is to enhance safety in the sewage treatment process through utilization of high temperature sterilization of both fluids and solids in raw sewage.

A further object is to convert sewage content water to a clean disposable form and to convert entrained solids to an oxidized powdered form with gasses vented from the system during the treatment process.

Features of the invention useful in accomplishing the above objects include, in a sewage water and solids treatment and disposal system, a system for process treating raw sewage on a batch basis receiving generally in the range from twenty to two hundred pounds of sewage per day through a steel cabinet with its bottom roughly the size of a fifty five gallon drum laid on its side. System sewage water with entrained solids as an effluent is fed into the trough bottom shaped process tank that is a totally enclosed tank other than for inlets and outlets therefore. The system disposes of water from sewage effluents and also residual solids thereof and is fed sewage to a controlled depth in a tank trough with high temperatures used to sterilize the effluent. A two-speed motor driven mixer driven at low speed continually mix and blend the sewage effluent at the same time air from a blower is bubbled through the mixture. Heat is added to increase water vapor saturation capability of the air flow through the system. The air/vapor flows through a recuperative heat exchanger supported within the tank above the surface of sewage effluent contained therein, absorbing heat with flow, through a catalyst bed in a chamber with circulation through the heat exchanger and on out an exhaust vent with impurities oxidized and vented with air flow. Heating elements subject to power control heat the tank and the heat exchanger.

A specific embodiment representing what is presently regarded as the best mode of carrying out the invention is illustrated in the accompanying drawings.

In the drawings:

FIG. 1, is a perspective interspatial showing of the sewage system tank and the system components as interrelated in a working system along with electrical circuitry and control in block schematic form; and, FIG. 2, an evaporation and incineration temperature-time curve for the sewage system tank through a sewage batch treatment cycle.

Referring to FIG. 1:

The new sewage treatment system 10 includes two major processing operations—water disposal and residual solids disposal with both utilizing high temperatures to sterilize the effluents as a safety measure in addition to heat reduction treatment of raw sewage fed into the system. Raw sewage is fed from a sewage flow control and shut off source 11 to and through feed line 12 into sewage treatment cabinet 13 that is a steel cabinet having a rounded bottom 14 like half of a fifty five gallon drum laid on its side. Opposite cabinet sides 15L and 15R and opposite front and rear end walls 16F and 16R extend vertically upward to cabinet enclosure top 17. Raw sewage in effluent form is fed through feed line 12 to fill the cabinet 13 bottom to as high a level as to activate level sensor 18 acting through line 19 to cut off raw sewage effluent flow through sewage flow control and shut off 11 to line 12. Two speed motor 20 mounted on the outside bottom of end wall 16F is connected to drive tube 21 that extends longitudinally through the sewage effluent in the bottom of sewage treatment cabinet 13 to a bearing support and air flow feed housing sleeve 22 at its end remote from motor 20. The housing sleeve receives air through line 23 from blower assembly 24, driven by motor 25, to bubble out through tube openings 26 and through the sewage effluent as the tube 21 is driven in slow rotation. Heat is added to the sewage effluent by heating coil 27 as power fed controlled through lines 28 and 29 from power supply and control 30. Control 30 is also connected through line 31 to sewage flow control and shut off 11, to motor 20 through line 32, to blower drive motor 25 through lines 33 and 34, and through lines 35 and 36 to heating coil 37 for catalytic heating chamber 38 to create chamber 38 temperature levels around twelve hundred degrees Fahrenheit.

Mixing arms 39 mounted on drive tube 21 extend outwardly therefrom at ninety degree intervals and spaced along the tube 21 driven at low speed aid in continually mixing and blending the sewage as air from blower 24 is also bubbled through the sewage mixture. Air/vapor flow passes from the cabinet 13 interior above sewage therein through line 40 into and through recuperative heat exchanger 41. The air vapor mixture passed therethrough picks up heat from existing exhaust flow from the catalyst bed in the catalyst chamber 42. The air/vapor flow from heat exchanger 41 passes through line 43 to catalyst chamber 42 and then exhausts from chamber 42 through line 44 to heat exchanger 41 and then therefrom through line 45 to the exterior of the cabinet 13. Heating of the catalytic reaction is supplemented by heat from coil 37 to maintain catalytic chamber temperature at around twelve hundred degrees Fahrenheit. FIG. 2 is the temperature-time curve for evaporation then incineration within cabinet 13.

After oxidation of residual residue (combustion) is completed, air that is drawn in through inlet 46 to the blower and through the system in the cabinet 13, the air flow with entrained matter is diverted. This flow dervision is accomplished by simultanious shut off of valve 51 in line 45 and opening of valve 52 in line 47 by control through lines 53 and 54, and lines 55 and 56, respectively, from power supply and control 30. Trough mixing drive tube 21 speed is increased to high speed to break-up the residual ash and with through air flow transport it through exhaust line 47 from cabinet 13 to vortex separator 48. Here ash collects and falls through bottom outlet 49 in ash disposal stream 50 for periodic manual removal. The system is then clean again and ready for another batch cycle of processing raw sewage.

It should be noted that the catalytic chamber 42 with its high operating temperature range is safely completely enclosed within cabinet 13.

Whereas this invention is herein illustrated and described with respect to a single embodiment thereof, it should be realized that various changes may be made without departing from the essential contributions to this are made by the teachings thereof.

I claim:

1. A sewage water and solids treatment and disposal unit comprising: cabinet enclosure means having a fluid sewage effluent with an entrained solids containment bottom; fluid sewage effluent feed means with fluid feed shut off means; fluid sewage effluent level sensing and control means connected for controlling said fluid feed shut off means; fluid sewage effluent stirring means with motor drive means, mounted on a wall of said cabinet enclosure means and drive connected to an elongate stirring projection extended into fluid sewage effluent held in the bottom of said cabinet enclosure means; stirring extensions mounted on said stirring projection; catalyst chamber means enclosed within said cabinet enclosure means above the uppermost fill level of fluid sewage effluent fed to said cabinet enclosure means; air and gas exhaust means from said catalyst chamber means and from said cabinet enclosure means; air feed means for said cabinet enclosure means; first heat means for said cabinet enclosure means and second heat means for said catalyst chamber means; and power supply and control means connected to both said first and second heat means; wherein said air feed means includes an air blower with air inlet means external to said cabinet enclosure means and air pipe means extended from said air blower to an air flow feed housing sleeve within said cabinet enclosure means; and said elongate stirring projection is tubular along a length thereof having tube wall openings and a portion thereof extended into said air flow feed housing sleeve.

2. The sewage treatment unit of claim 1, wherein said air flow feed housing sleeve is also a support bearing for said elongate stirring projection.

3. The sewage treatment unit of claim 2, wherein sewage effluent mixing arms are mounted to extend radially outward from said elongate stirring projection at longitudinally spaced intervals therealong.

4. The sewage treatment unit of claim 2, wherein a vortex separator is connected to receive particle laden air flow through an exhaust line connected from said cabinet enclosure means to said vortex separator; said vortex separator having a bottom outlet for particle drop out removal.

5. The sewage treatment unit of claim 4, further comprising first open and close valve means in said air and gas exhaust means; second open and close valve means in said exhaust line and control line means interconnecting said first open and close valve means and said second open and close valve means with said power supply and control means for alternate closing and opening control of said first open and close valve means and said second open and close valve means.

6. The sewage treatment unit of claim 5, wherein said fluid feed shut off means is connected to said power supply and control means for repeated cycles of sewage treatment processing.

7. The sewage treatment unit of claim 6, wherein said motor drive means is connected to said power supply and control means for repeated cycles of sewage treatment processing.

8. The sewage treatment unit of claim 7, wherein said first heat means for said cabinet enclosure means is connected to said power supply and control means for heating sewage effluent in said cabinet enclosure means to approximately two hundred and twelve degrees Fahrenheit through an air evaporation period in each cycle and then to approximately four hundred and fifty degrees Fahrenheit through an incineration period in each sewage treatment processing cycle.

9. The sewage treatment unit of claim 8, wherein a recuperative heat exchanger means is included within said cabinet enclosure means with incoming air, gas and airborn debris being passed through said heat exchanger on the way through tubing to said catalyst chamber; and said gas exhaust means from said catalyst chamber means includes gas exhaust passage through said heat exchanger.

10. The sewage treatment unit of claim 9, wherein heating of a catalytic reaction in said catalyst chamber is supplemented by heat from said second heat means to attain and maintain a catalytic chamber temperature of approximately twelve hundred degrees Fahrenheit.

11. A sewage water and solids treatment and disposal unit comprising: cabinet enclosure means having a fluid sewage effluent with an entrained solids containment bottom; fluid sewage effluent feed means with fluid feed shut off means; fluid sewage effluent level sensing and control means connected for controlling said fluid feed shut off means; fluid sewage effluent stirring means with motor drive means, mounted on a wall of said cabinet enclosure means and drive connected to an elongate stirring projection extended into fluid sewage effluent held in the bottom of said cabinet enclosure means; stirring extensions mounted on said stirring projection; catalyst chamber means enclosed within said cabinet enclosure means above the uppermost fill level of fluid sewage effluent fed to said cabinet enclosure means; air and gas exhaust means from said catalyst chamber means and from said cabinet enclosure means; air feed means for said cabinet enclosure means; first heat means for said cabinet enclosure means and second heat means for said catalyst chamber means; and power supply and control means connected to both said first and second heat means; wherein a vortex separator is connected to receive particle laden air flow through an exhaust line connected from said cabinet enclosure means to said vortex separator; said vortex separator having a bottom outlet for particle drop out removal.

12. The sewage treatment unit of claim 11, further comprising first open and close valve means in said air and gas exhaust means; second open and close valve means in said exhaust line and control line means interconnecting said first open and close valve means and said second open and close valve means with said power supply and control means for alternate closing and opening control of said first open and close valve means and said second open and close valve means.

13. The sewage treatment unit of claim 12, wherein said fluid feed shut off means is connected to said power supply and control means for repeated cycles of sewage treatment processing.

14. The sewage treatment unit of claim 13, wherein said motor drive means is connected to said power supply and control means for repeated cycles of sewage treatment processing.

15. The sewage treatment unit of claim 14, wherein said first heat means for said cabinet enclosure means is connected to said power supply and control means for heating sewage effluent in said cabinet enclosure means to approximately two hundred and twelve degrees Fahrenheit through an air evaporation period in each cycle and then to approximately four hundred and fifty degrees Fahrenheit through an incineration period in each sewage treatment processing cycle.

16. The sewage treatment unit of claim 15, wherein a recuperative heat exchanger means is included within said cabinet enclosure means with incoming air, gas and airborn debris being passed through said heat exchanger on the way through tubing to said catalyst chamber; and said gas exhaust means from said catalyst chamber means includes gas exhaust passage through said heat exchanger.

17. The sewage treatment unit of claim 16, wherein heating of a catalytic reaction in said catalyst chamber is supplemented by heat from said second heat means to attain and maintain a catalytic chamber temperature of approximately twelve hundred degrees Fahrenheit.

* * * * *